F. S. DRIGGS.
CREAM DIPPER.
APPLICATION FILED NOV. 1, 1921.
1,426,968.
Patented Aug. 22, 1922.
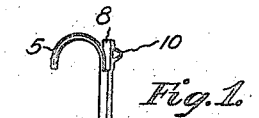
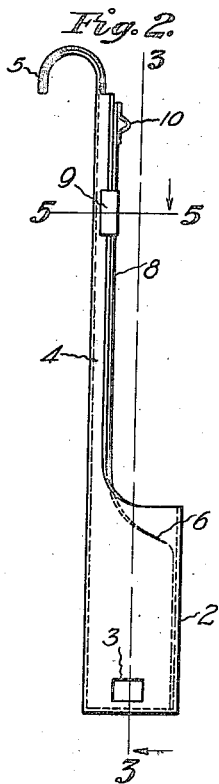
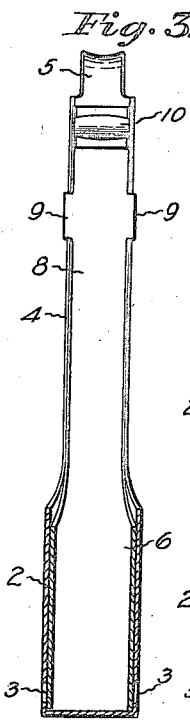
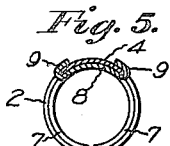
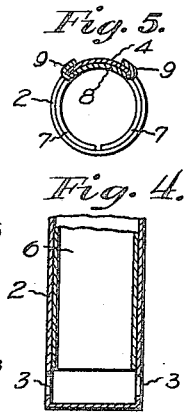
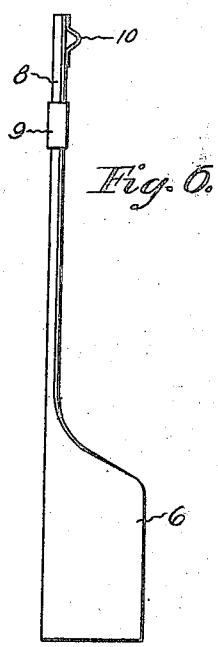
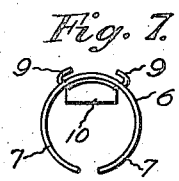
INVENTOR
Frank S. Driggs
ATTORNEY

UNITED STATES PATENT OFFICE.

FRANK S. DRIGGS, OF SOUTHINGTON, CONNECTICUT.

CREAM DIPPER.

1,426,968.  Specification of Letters Patent.  Patented Aug. 22, 1922.

Application filed November 1, 1921. Serial No. 512,045.

*To all whom it may concern:*

Be it known that FRANK S. DRIGGS, a citizen of the United States, residing at Southington, in the county of Hartford and State of Connecticut, has invented certain new and useful Improvements in Cream Dippers, of which the following is a specification.

This invention relates to a cream-dipper. An article of this character is usually submerged into a container such as a bottle of milk, the purpose being to skim off the cream on the upper side of the milk. While I have a number of objects in view, the principal ones of them are the provision of an article of the character set forth, which is capable of inexpensive construction, which can be easily used, and which will promptly skim off the cream on the upper side of a body of milk in a bottle or other receptacle.

In the drawings accompanying and forming part of the present specification I have shown in detail, one of the several forms of embodiment of the invention which to enable those skilled in the art to practice the same will be set forth fully in the following description. Clearly I am not restricted to such disclosure. I may depart therefrom in a number of respects within the scope of the invention defined by the claim following said description.

Referring to said drawings.

Figure 1 is an elevation of part of a milk bottle with the cream dipper therein.

Fig. 2 is a side elevation of said cream dipper.

Fig. 3 is a vertical section looking from the front, with the valve closed.

Fig. 4 is a vertical sectional view of the lower part of the device with the valve open.

Fig. 5 is a cross section on the line 5—5 of Fig. 2.

Fig. 6 is a side elevation of the valve.

Fig. 7 is a bottom plan view of the same.

Like characters refer to like parts throughout the several views, which are on different scales.

It has been the usual custom heretofore when milk is delivered in bottles, to skim off the top of the milk or cream by pouring. By the implement constituting the subject matter of the present case, I can remove this creamy substance in a very effective and ready manner without loss.

The device includes in its make up a body, and the hollow cylinder 2 answers satisfactorily in this event it being closed at its bottom and having as shown diametrically opposite ports or openings 3 for the entrance of the cream at such time as the opened ports 3 are sunk below the cream level by the submergence of the body 2 therein. As shown the cylindrical hollow body 2 has extending upwardly from its rear the handle or shank 4 which terminates as shown, at its upper end in a hook as 5 which may receive the index finger of the hand when the device is in action. Although the diametrically opposite ports 3 to which I have referred may be of any proper shape they are as shown of virtually rectangular formation and are in adjacence to the bottom of said cylindrical body 2 so as to provide for the maximum inflow of cream when the body 2 is submerged therein.

Said body 2 encloses as shown, a valve member as 6 which is of cylindrical form in cross section and which comprises duplicate wings as 7 extending oppositely from the lower end of the shank 8. These valve wings 7 are resilient or springy and control the respective ports or openings 3. The valve member 6 closely fits within the body 2 and owing to the resiliency of the valve wings 7 insures proper contact therebetween and the inner surface of the body 2.

The shank 8 as shown has between its ends the ears or lugs 9 bent around the handle or shank 4 and provided as shown, at its upper end portion on the forward side thereof, with the projection 10 which can be engaged by the thumb so as to move the shank 8 longitudinally either up or down of the handle 4, lateral movement of these parts being positively prevented by the ears or lugs 9 and also by the fact that both the handle 4 and the shank 8 are channeled or arched in cross section. As shown their channeled sides face outwardly.

It is believed that the action of the device will be clearly understood although it is not amiss to refer to it briefly. It will be assumed that the valve member 6 is closed in which event the wings 7 thereof tightly cross the ports or openings 3, the valve member practically resting on the bottom of the body 2. With the device in this condition the body 2 is introduced for instance into a milk bottle 11, until the openings or ports 3 are below the cream level. When this occurs, the valve member 6 will be lifted by upward pressure on the projection 10, to thus permit the cream of the milk or flow into the body 2 by way of the ports or openings 3 therein. When the body is filled or when it contains the necessary amount cream, the valve member 6 will be closed by a downward pressure against the projection 10 at which point the dipper is lifted from the bottle. The cream in the body 2 can then be poured from it or the valve member 6 opened, to permit the passage of the cream through the ports or openings 3.

The valve member 6, which as stated is of cylindrical form, involves duplicate wings 7 which extend oppositely from the lower end of the shank 8. The resilient valve wings control, in the construction shown, the ports or openings 3 and owing to their nature are maintained at all times in proper contact with the inner surface of the cylindrical body 2 so that they stay with certainty in any position in which they may be left, being shown in their extreme positions in the sectional views, Figs. 3 and 4. This insures at proper times the correct filling of the body 2 and afterward its complete and adequate emptying. The shank 8 is transversely curved and it rides against the transversely curved handle or shank 4 around which fit the springy ears 9 which extend sidewise from the shank 8.

What I claim is:—

A cream dipper of the class described comprising a hollow cylindrical body closed at its lower end and having a circumferential port above said closed end and also having an upwardly extending handle which rises from the upper edge portion of the body, and a valve member in the body, comprising resilient wings to frictionally engage the inner surface of the body, for controlling said port, the valve member having an upwardly extending shank slidable against and longitudinally of the handle, the shank being transversely arched, having lateral lugs bent around the edges of the handle, the handle having at its upper end a hook and the shank having a projection on its forward side.

In testimony whereof I affix my signature.

FRANK S. DRIGGS.

In presence of—
 MARY F. LONG,
 HEATH SUTHERLAND.